(12) United States Patent
Chiang

(10) Patent No.: US 7,639,435 B2
(45) Date of Patent: Dec. 29, 2009

(54) OPTICAL MODULE WITH ADHESIVELY MOUNTED FILTER

(75) Inventor: Tsung-Wei Chiang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/840,172

(22) Filed: Aug. 16, 2007

(65) Prior Publication Data
US 2008/0247064 A1 Oct. 9, 2008

(30) Foreign Application Priority Data
Apr. 4, 2007 (CN) .................. 2007 1 0200385

(51) Int. Cl.
*G02B 7/02* (2006.01)
(52) U.S. Cl. ...................... 359/819; 359/811

(58) Field of Classification Search .......... 359/819
See application file for complete search history.

(56) References Cited

U.S. PATENT DOCUMENTS

| 2006/0028573 A1* | 2/2006 | Seo et al. ............ 348/340 |
| 2007/0285555 A1* | 12/2007 | Chen ................. 348/340 |
| 2008/0093390 A1* | 4/2008 | Yu .................... 222/330 |
| 2008/0106632 A1* | 5/2008 | Yuan .................. 348/340 |

* cited by examiner

*Primary Examiner*—Jordan M. Schwartz
*Assistant Examiner*—James C Jones
(74) *Attorney, Agent, or Firm*—Clifford O. Chi

(57) ABSTRACT

An optical module includes a lens barrel (10). At least one lens (20) and a spacer (30) are mounted in the lens barrel. A filter (40) is glued to the lens barrel and the spacer with an adhesive so as to prevent the at least one lens and the spacer from falling out of the lens barrel.

12 Claims, 6 Drawing Sheets

OPTICAL MODULE WITH ADHESIVELY MOUNTED FILTER

BACKGROUND OF THE INVENTION

1. Technical Field

The present invention relates to optical modules used in photography and imaging equipment and, particularly, to optical modules for digital cameras.

2. Description of the Related Art

In recent years, camera modules for taking photos have begun to be incorporated in mobile terminals, such as mobile phones and lap-top computers. Most mobile terminals devices are, progressively becoming more miniaturized over time, and digital camera modules are, correspondingly, becoming smaller and smaller. Nevertheless, in spite of the small size of a contemporary digital camera module, consumers still demand excellence in image quality.

Optical modules used for digital camera modules typically include a barrel, a lens module, a spacer, and a filter. The lens module and the spacer are received in the barrel. Generally, the filter is fixed with a spacer in the barrel, by using an adhesive, for example. However, the non-uniformity and/or the insufficiency (e.g., not enough initially applied; not adequately durable; etc.) of the adhesive will likely allow the filter to fall out of the barrel, in the long run.

What is needed, therefore, is a new optical module that can overcome the above-described shortcomings.

SUMMARY OF THE INVENTION

An optical module includes a lens barrel. At least one lens and a spacer are mounted in the lens barrel. A filter is glued (i.e., adhesively mounted) to both the lens barrel and the spacer with an adhesive, so as to prevent the at least one lens and the spacer from falling out of the lens barrel.

Other novel features will become more apparent from the following detailed description when taken in conjunction with the accompanying drawings.

BRIEF DESCRIPTION OF THE DRAWINGS

Many aspects of the present optical module can be better understood with reference to the following drawings. The components in the drawings are not necessarily drawn to scale, the emphasis instead being placed upon clearly illustrating the principles of the present optical module. Moreover, in the drawings, like reference numerals designate corresponding parts.

DETAILED DESCRIPTION OF THE INVENTION

Reference will now be made to the drawings to describe in detail at least one preferred embodiment of the present optical module.

Figure 1:
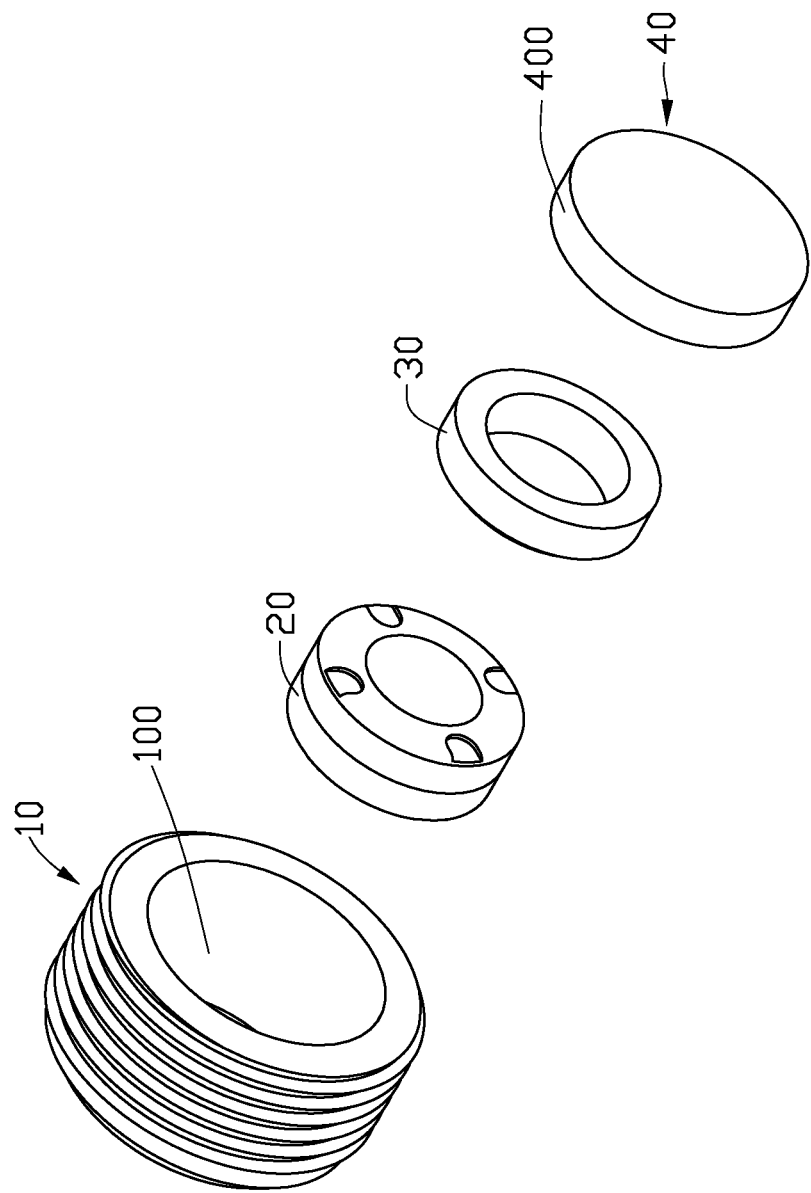
FIG. 1 is an exploded perspective view of an optical module, in accordance with a first embodiment.
Figure 2:
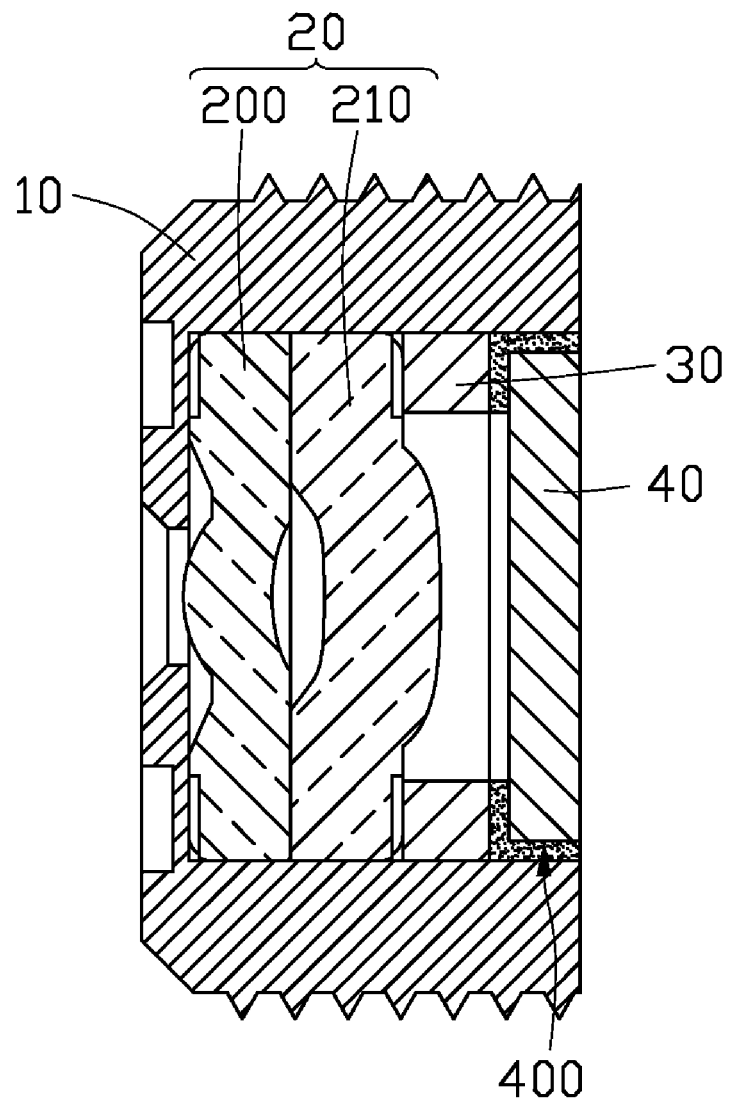
FIG. 2 is a schematic, cross-sectional view of an optical module, in accordance with the first embodiment.

Referring to FIGS. 1 and 2, an optical module, according to a first present embodiment, includes a lens barrel 10, a lens module 20, a spacer 30, and a filter 40. The lens module 20, the spacer 30, and the filter 40 are engagingly received in the lens barrel 10, one on top of the other, in that order.

The lens barrel 10 is substantially a hollow cylinder, having a partially-closed end and an open end. The open end is opposite to the partially-closed end. The partially-closed end is adjacent to the lens module 20, and the open end is adjacent to the filter 40. The partially-closed end particularly includes a lip/ledge (not labeled) that extends inwardly of the main portion of the lens barrel 10. The lip/ledge serves to retain the lens module 20 within the lens barrel 10 and also defines a light aperture through which light passing through the optical module may travel. The lens barrel 10 has/defines an inner wall 100. The filter is 40 glued/adhered to both the inner wall 100 and the spacer 30.

The lens module 20 includes at least one lens. In the illustrated embodiment, the lens module 20 includes two lenses 200, 210. It is to be understood that lenses of any number and type could be used in the lens module 20.

The spacer 30 is substantially ring-shaped. The spacer 30 is engagingly received in the lens barrel 10. The spacer 30 is configured for adjusting/establishing a separation distance between the lens module 20 and other optical elements (for example, the filter 40) of the optical module.

The filter 40 is substantially disk-shaped, and the filter 40 has an outer periphery 400. The filter 40 is received in the lens barrel 10. The filter 40 is used to selectively transmit light having certain desired/chosen properties, while blocking light lacking those desired properties. The filter 40 can be selected, for example, from a group consisting of infrared-cut filters and low pass filters. An outer diameter of the filter 40 is a little smaller than an inner diameter of the lens barrel 10, thus establishing a clearance fit therebetween in which a certain volume of an adhesive may be received.

In assembly of the optical module, the lens module 20, the spacer 30, and the filter 40 are received in the lens barrel 10, in that order. Then, a surface of filter 40, opposite to the spacer 30, and the outer periphery 400 of the filter 40 are respectively glued/adhered to the spacer 30 and the inner wall 100 of the lens barrel 10, by using an adhesive, for example. Gluing a surface of filter 40 to the spacer 30 and the inner wall 100 with an adhesive prevents the lens module 20 and spacer 30 from falling out of the lens barrel 10 and fixes the lens module 20 and the spacer 30 in the lens barrel 10. Essentially, the lip/ledge of partially-closed end of the lens barrel 10 hold such elements in place, from one direction, and the glued-in-place filter 40 closes the open end of the lens barrel 10, so as block movement through that end. At this time, the spacer 30 is located between the lens module 20 and the filter 40, with the spacer 30 abutting the lens module 20 and adjoining the filter 40 and with the filter 40 adjoining the inner wall 100. The portions of the filter 40 directly adjoining the spacer 30 and the inner wall 100 are coated with adhesive to ensure the desired mounting of the filter 40. The optical module is thus completely assembled.

In the above-described assembly processes, the filter 40 is secured in the lens barrel 10 by using an adhesive to glue it to both the spacer 30 and the inner wall 100 of the lens barrel 10, thereby enhancing the adhesion between the filter 40 and the lens barrel 10 and preventing the lens module 20 and the spacer 30 from falling out of the lens barrel 10.

Figure 3:
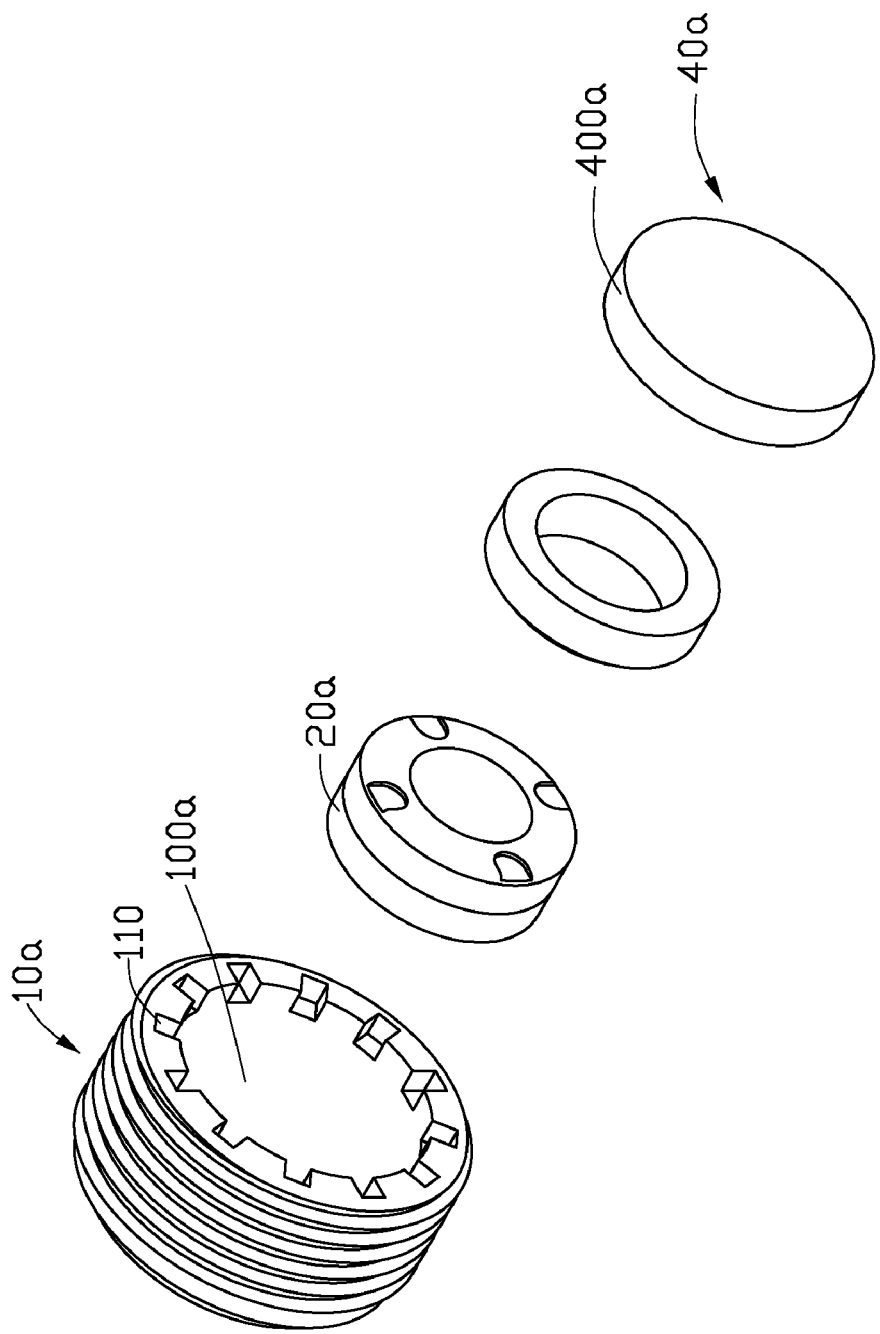
FIG. 3 is an exploded perspective view of an optical module, in accordance with a second embodiment.
Figure 4:
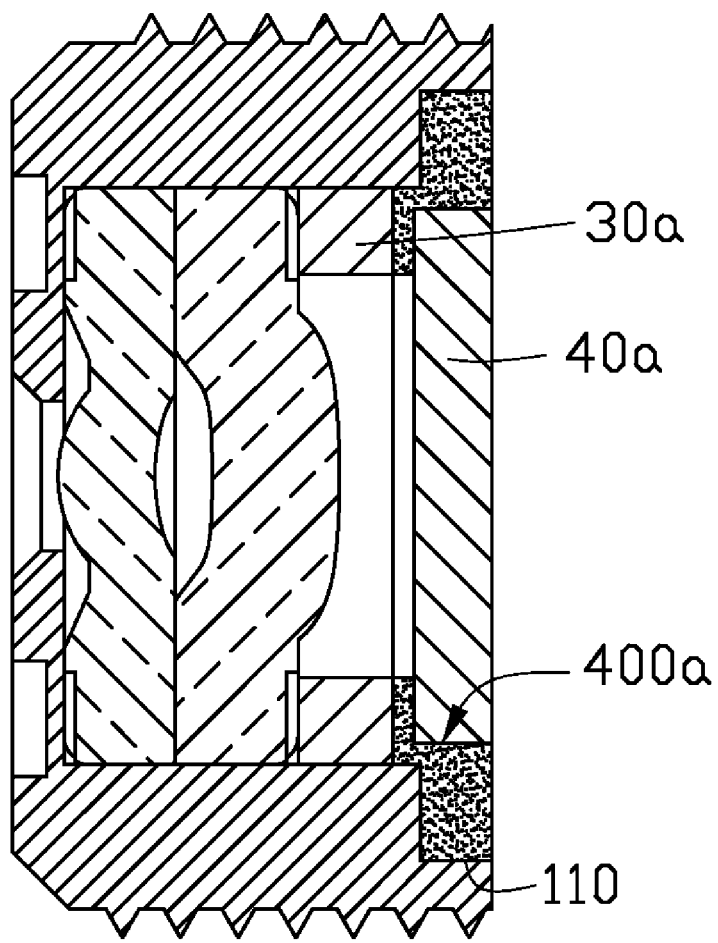
FIG. 4 is a schematic, cross-sectional view of an optical module, in accordance with the second embodiment.

Referring to FIGS. 3 and 4, an optical module, according to a second present embodiment, is shown. Most of the structure of the optical of the second embodiment is similar to that of the optical module of the first embodiment, except that a plurality of grooves 110 is uniformly defined in the inner wall 100a of the lens barrel 10a. The plurality of grooves 110 and the outer periphery 400a of the filter 40a, cooperatively, form an adhesive stop mechanism. The adhesive stop mechanism is configured for receiving an amount of the adhesive used for adhering the filter 40a to the lens barrel 10a, preventing it from infiltrating into the lens module 20a or at least greatly reducing the chance thereof to occur. It is to be understood that the plurality of grooves 110 of any type/configuration could be used in the optical module. In the illustrated embodiment, the type of grooves of the plurality of grooves 110 is cubic grooves.

In the above-described assembly processes, the filter 40a is glued to both the inner wall 100a and the spacer 30a by using an adhesive. When/if the adhesive is dilute, it will infiltrate into the adhesive stop mechanism, thus greatly reducing, if not preventing, the opportunity for the adhesive to pollute/contaminate the lens module 20a. Imaging quality of the optical module can thus be improved and/or better ensured.

Figure 5:
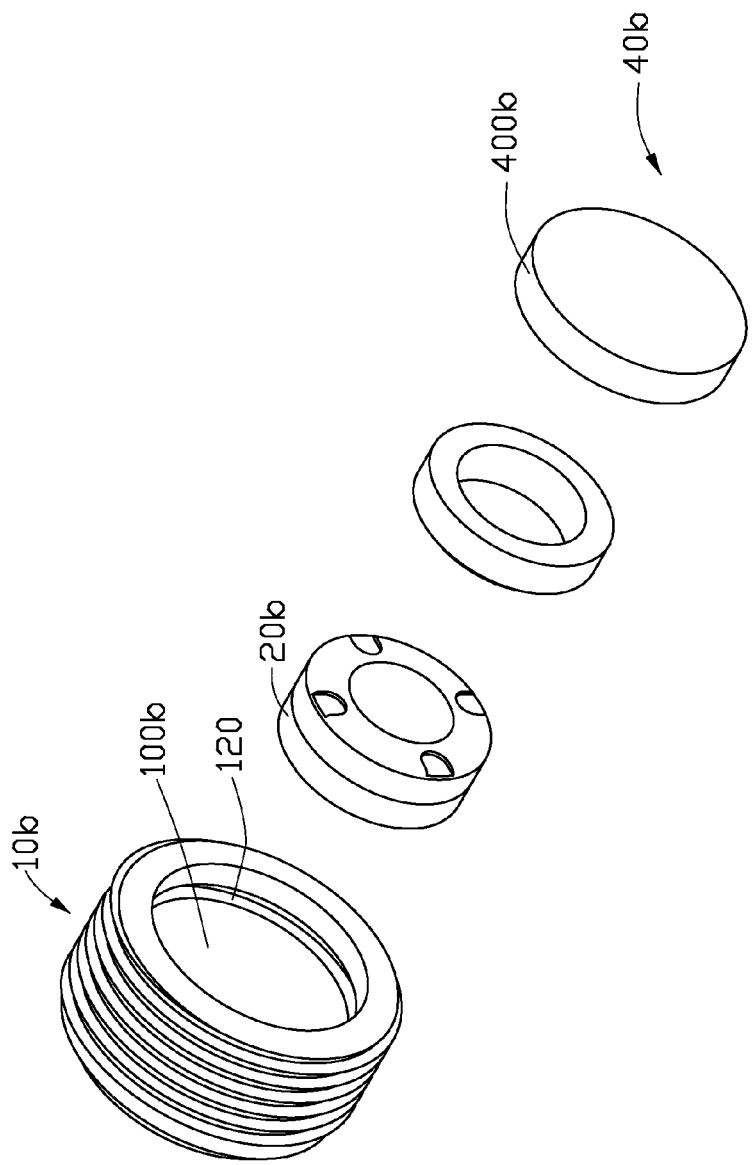
FIG. 5 is an exploded perspective view of an optical module, in accordance with a third embodiment.
Figure 6:
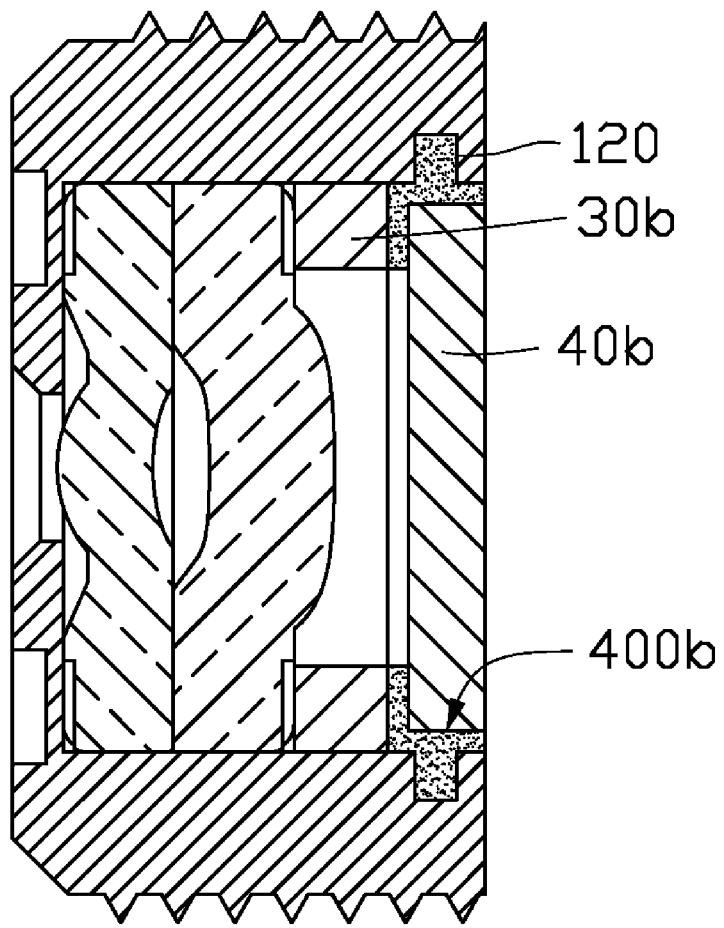
FIG. 6 is a schematic, cross-sectional view of an optical module, in accordance with the third embodiment.

Referring to FIGS. 5 and 6, an optical module, according to a third present embodiment, is shown. Most of the structure of the optical module of the third embodiment is similar to that of the optical module of the first embodiment, except that at least one annular groove 120 is defined in the inner wall 100b of the lens barrel 10b. The annular groove 120 and the outer periphery 400b of the filter 40b, cooperatively, form an adhesive stop mechanism to store an amount of the adhesive used for adhering the filter 40b to both the lens barrel 10b and the spacer 30b, thereby greatly reducing, if not preventing, the opportunity for the adhesive to pollute/contaminate the lens module 20b (e.g., by receiving a potential excess amount of adhesive). Imaging quality of the optical module can thus be improved.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. An optical module, comprising:
a lens barrel comprising an inner wall;
at least one lens, a spacer, and a filter engagingly received in the lens barrel, with the spacer abutting the at least one lens and adjoining the filter, the filter having a surface opposite to the spacer and an outer periphery opposite to the inner wall of the lens barrel;
an adhesive disposed both between the surface of the filter and the spacer, and between the outer periphery of the filter and the inner wall of the lens barrel; and
a plurality of grooves uniformly defined in the inner wall of the lens barrel and configured for receiving a part of the adhesive, the grooves being adjacent to the outer periphery of the filter.

2. An optical module, comprising:
a lens barrel comprising an inner wall;
at least one lens, a spacer, and a filter engagingly received in the lens barrel, with the spacer abutting the at least one lens and adjoining the filter, the filter having a surface opposite to the spacer and an outer periphery opposite to the inner wall of the lens barrel;
an adhesive disposed both between the surface of the filter and the spacer, and between the outer periphery of the filter and the inner wall of the lens barrel; and
at least one annular groove defined in the inner wall of the lens barrel and configured for receiving a part of the adhesive, each annular groove being adjacent to the outer periphery of the filter.

3. An optical module, comprising:
a lens barrel;
at least one lens, and a spacer mounted in the lens barrel;
a filter;
a first adhesive disposed between the filter and the spacer;
a second adhesive; and
an adhesive stop mechanism associated with the lens barrel and configured for receiving the second adhesive to hold an outer periphery of the filter and the lens barrel together,
wherein the adhesive stop mechanism comprises an annular groove defined in an inner wall of the lens barrel.

4. The optical module as claimed in claim 1, wherein the lens barrel is a hollow cylinder having a partially-closed end and an open end, the open end is opposite to the partially-closed end, the partially-closed end is adjacent to a given lens of the at least one lens, and the open end is adjacent to the filter.

5. The optical module as claimed in claim 1, wherein the spacer is ring-shaped.

6. The optical module as claimed in claim 1, wherein the filter is disk-shaped.

7. The optical module as claimed in claim 2, wherein the lens barrel is a hollow cylinder having a partially-closed end and an open end, the open end is opposite to the partially-closed end, the partially-closed end is adjacent to a given lens of the at least one lens, and the open end is adjacent to the filter.

8. The optical module as claimed in claim 2, wherein the spacer is ring-shaped.

9. The optical module as claimed in claim 2, wherein the filter is disk-shaped.

10. The optical module as claimed in claim 3, wherein the lens barrel is a hollow cylinder having a partially-closed end and an open end, the open end is opposite to the partially-closed end, the partially-closed end is adjacent to a given lens of the at least one lens, and the open end is adjacent to the filter.

11. The optical module as claimed in claim 3, wherein the spacer is ring-shaped.

12. The optical module as claimed in claim 3, wherein the filter is disk-shaped.

* * * * *